United States Patent
Christensen et al.

(10) Patent No.: US 10,859,016 B2
(45) Date of Patent: Dec. 8, 2020

(54) METHODS AND SYSTEM FOR DIAGNOSING BELT SLIP OF AN ENGINE FRONT END ACCESSORY DRIVE

(71) Applicant: Ford Global Technologies, LLC, Dearborn, MI (US)

(72) Inventors: M. Scott Christensen, Canton, MI (US); Michael Bastanipour, Ferndale, MI (US); Nicholas Herhusky, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 16/242,903

(22) Filed: Jan. 8, 2019

(65) Prior Publication Data
US 2020/0217257 A1 Jul. 9, 2020

(51) Int. Cl.
| | |
|---|---|
| *F02D 41/02* | (2006.01) |
| *F02D 29/00* | (2006.01) |
| *B60W 10/06* | (2006.01) |
| *B60W 20/00* | (2016.01) |

(52) U.S. Cl.
CPC .......... *F02D 41/021* (2013.01); *B60W 10/06* (2013.01); *B60W 20/00* (2013.01); *F02D 29/00* (2013.01); *F02D 2200/101* (2013.01); *F02D 2200/1002* (2013.01); *F02D 2200/50* (2013.01); *F02D 2250/18* (2013.01)

(58) Field of Classification Search
CPC .. F02D 41/02; F02D 41/021; F02D 2200/101; F02D 2200/1002; F02D 2200/50; F02D 2250/18; F02D 29/00; G06F 7/00; G06F 17/00; B60W 10/06; B60W 10/107; B60W 20/00; B60W 30/18; B60W 30/1843; B60W 30/188
USPC .............. 701/51, 54, 90, 101, 110, 111, 114
See application file for complete search history.

(56) References Cited

U.S. PATENT DOCUMENTS

| | | | |
|---|---|---|---|
| 4,493,221 A * | 1/1985 | Stieg | F16H 61/66245 474/11 |
| 7,174,245 B2 | 2/2007 | Ries-Mueller et al. | |
| 2003/0038803 A1 | 2/2003 | Morein et al. | |
| 2005/0274197 A1 | 12/2005 | Le | |
| 2015/0284003 A1 * | 10/2015 | Gauthier | F02D 37/02 701/54 |
| 2016/0230855 A1 | 8/2016 | Antchak et al. | |
| 2018/0216548 A1 * | 8/2018 | Claywell | F02B 37/162 |

* cited by examiner

*Primary Examiner* — John Kwon
*Assistant Examiner* — Johnny H Hoang
(74) *Attorney, Agent, or Firm* — Geoffrey Brumbaugh; McCoy Russell LLP

(57) ABSTRACT

Systems and methods for detecting and mitigating belt slip of an engine front end accessory drive are described. In one example, three different signals are input to a weighted average filter to determine the presence or absence of belt slip so that quality of an indication of belt slip may be improved.

14 Claims, 6 Drawing Sheets

METHODS AND SYSTEM FOR DIAGNOSING BELT SLIP OF AN ENGINE FRONT END ACCESSORY DRIVE

FIELD

The present description relates to methods and a system for determining, reporting, and compensating belt slip of an engine front end accessory drive.

BACKGROUND AND SUMMARY

An engine may include one or more belts to transfer torque from the engine to accessories. The belts may be coupled to the engine's crankshaft at the front of the engine such that they may be referred to as a front end accessory drive (FEAD). The engine system may include a belt integrated starter/generator (BISG) that may be coupled to the engine via a belt. The BISG may provide torque to rotate the engine, or alternatively, the BISG may extract torque from the engine to generate charge that may be stored in the electric energy storage device. During some conditions, it may be possible to generate slip between a belt and the engine's crankshaft. The slip may result in audible noise and the slip may increase belt wear. In addition, it may be possible to generate slip between the belt and the BISG. Vehicle operators are often relied upon to seek service for the vehicle if audible belt slip is noticed while the vehicle is being operated. However, autonomous vehicles do not require a human driver and some autonomous vehicles may not even carry passengers. Therefore, it may be desirable to provide a way of assessing whether or not belt slip is present, and if so, taking mitigating actions and notifying a vehicle scheduler that conditions may be desirable for vehicle maintenance.

The inventors herein have recognized the above-mentioned issues and have developed an engine operating method, comprising: indicating a belt slippage via a controller, the belt slippage indicated responsive to a weighted average of a first moment of inertia threshold being crossed, a second moment of inertia threshold being crossed, and an audible signal amplitude or power level being crossed; and adjusting operation of a machine responsive to the indication of belt slippage.

By inputting three different sources that may be indicative of belt slip to a weighted average filter, it may be possible to improve veracity of an indication of belt slip. In one example, a first moment of inertia is determined and compared to a first moment of inertia threshold. If the first moment of inertia threshold is crossed (e.g., passed through or the first moment of inertia being less than the first moment of inertia threshold) by the first moment of inertia, then an indication that the first moment of inertia threshold has been crossed is input to the weighted average filter. Further, a second moment of inertia is determined and compared to a second moment of inertia threshold. If the second moment of inertia threshold is crossed (e.g., passed through or the second moment of inertia being less than the second moment of inertia threshold) by the second moment of inertia, then an indication that the second moment of inertia threshold has been crossed is input to the weighted average filter. Finally, output of a fast Fourier transform is input to the weighted average filter. The weighted average filter evaluates its inputs and may provide an indication of belt slip that is responsive to the three inputs.

The present description may provide several advantages. In particular, the approach may improve reliability of belt slip detection. Further, the approach includes a technique for sampling a microphone that may reduce computational load on a controller. In addition, the approach may be implemented via existing vehicle hardware so that system cost increases may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
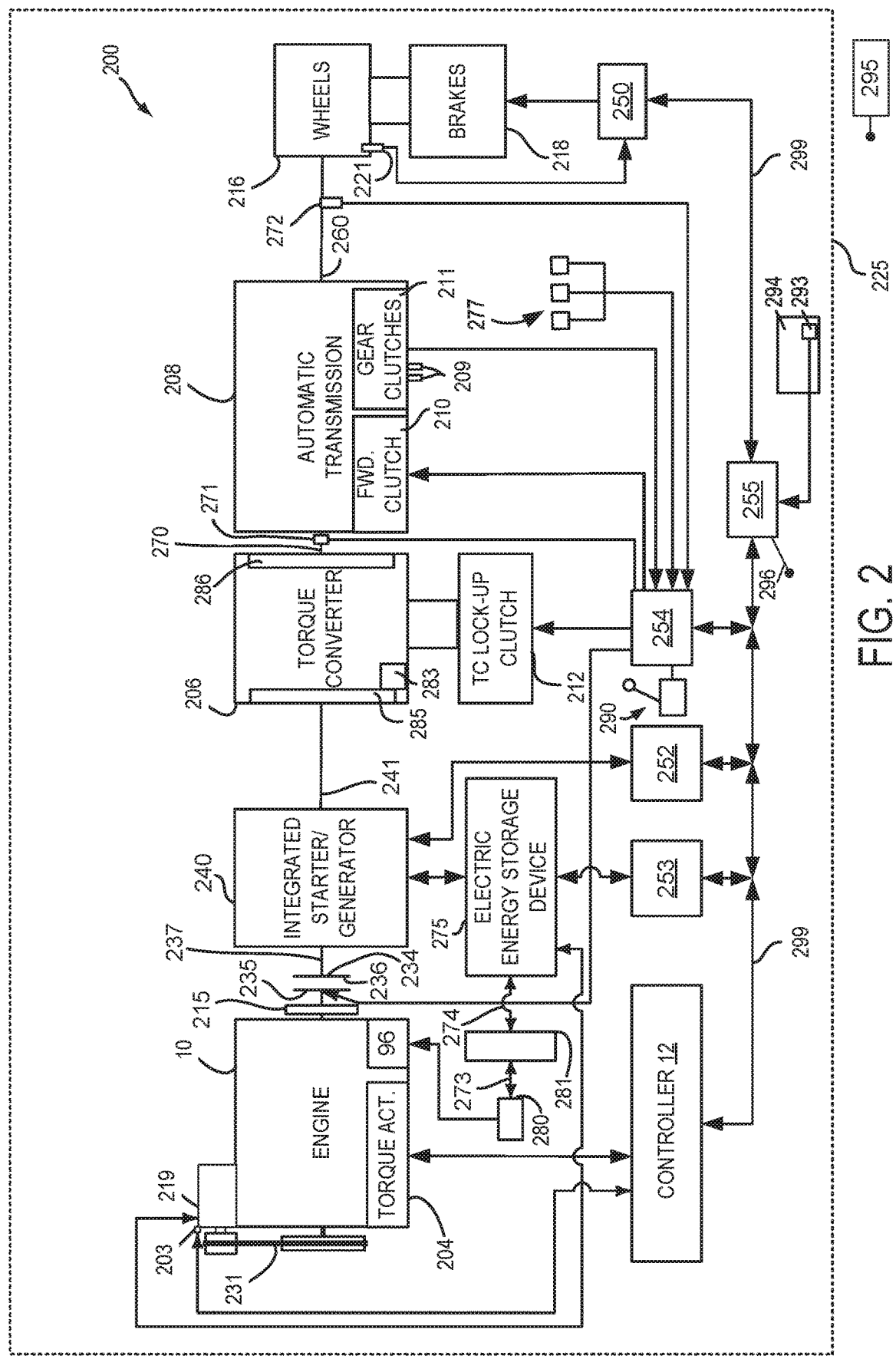
FIG. 2 is a schematic diagram of a hybrid vehicle driveline.
Figure 3:
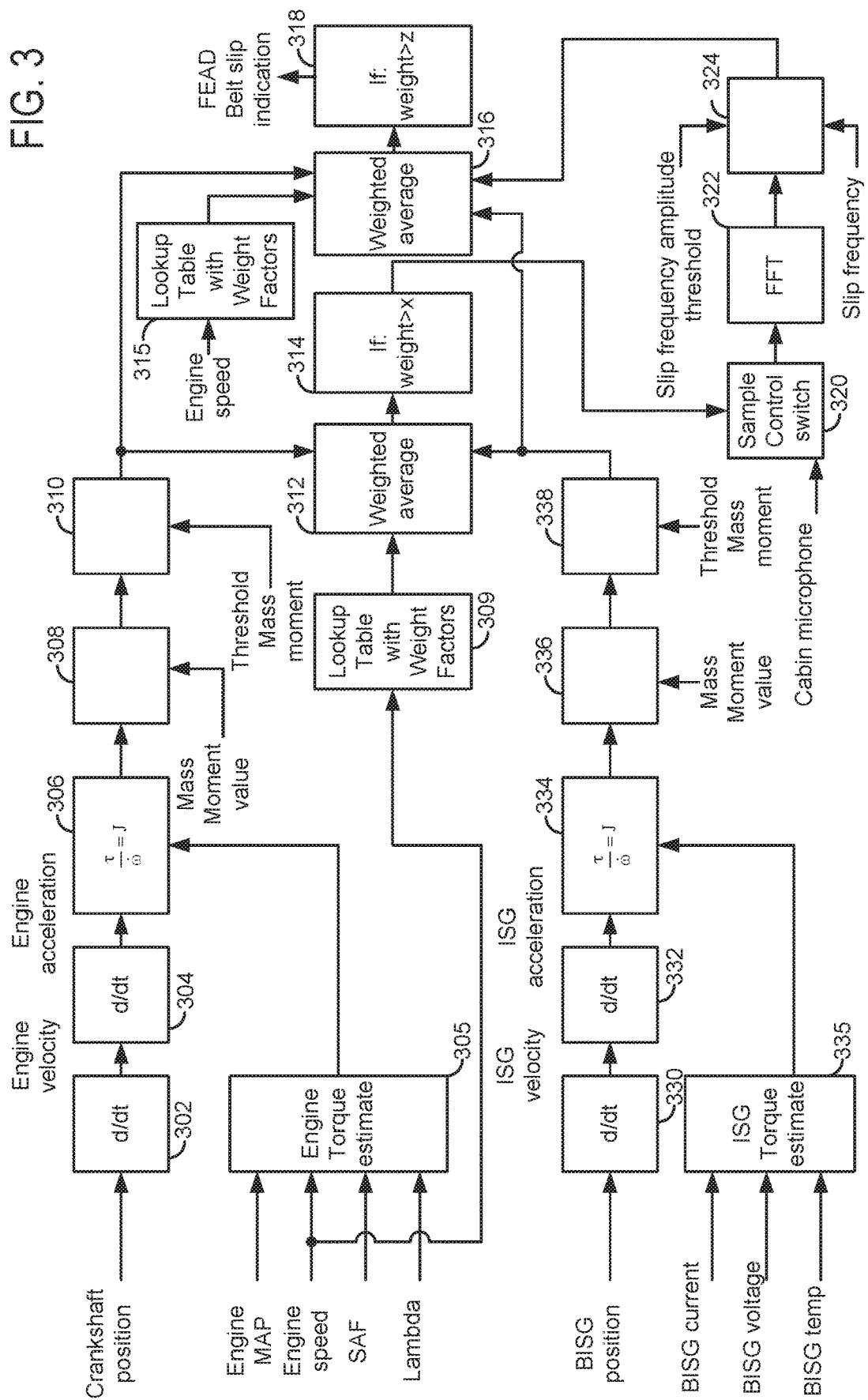
FIG. 3 is a block diagram showing how an indication of belt slip may be provided.
Figure 5:
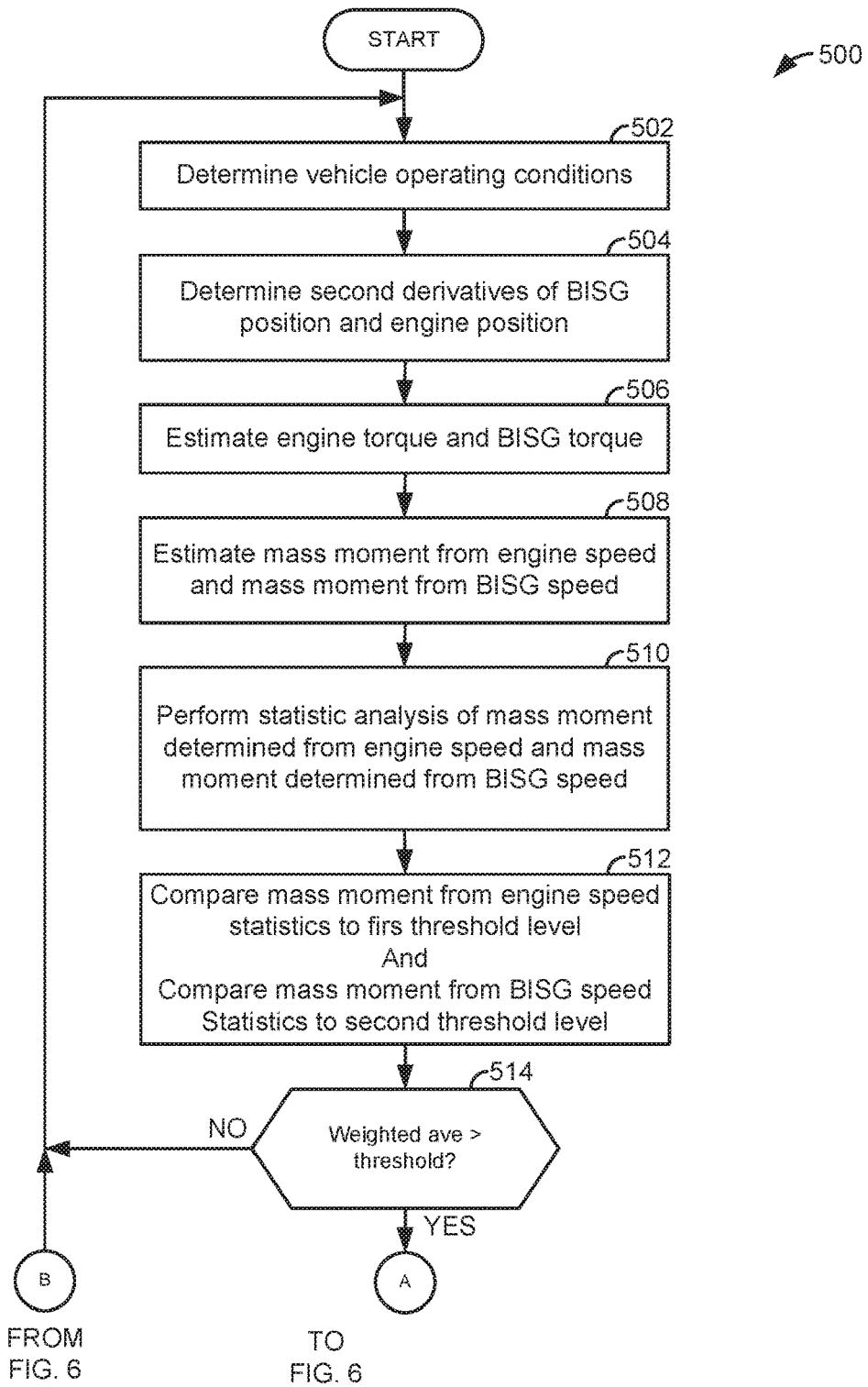
FIGS. 5 and 6 show a method for detecting belt slip.
Figure 6:
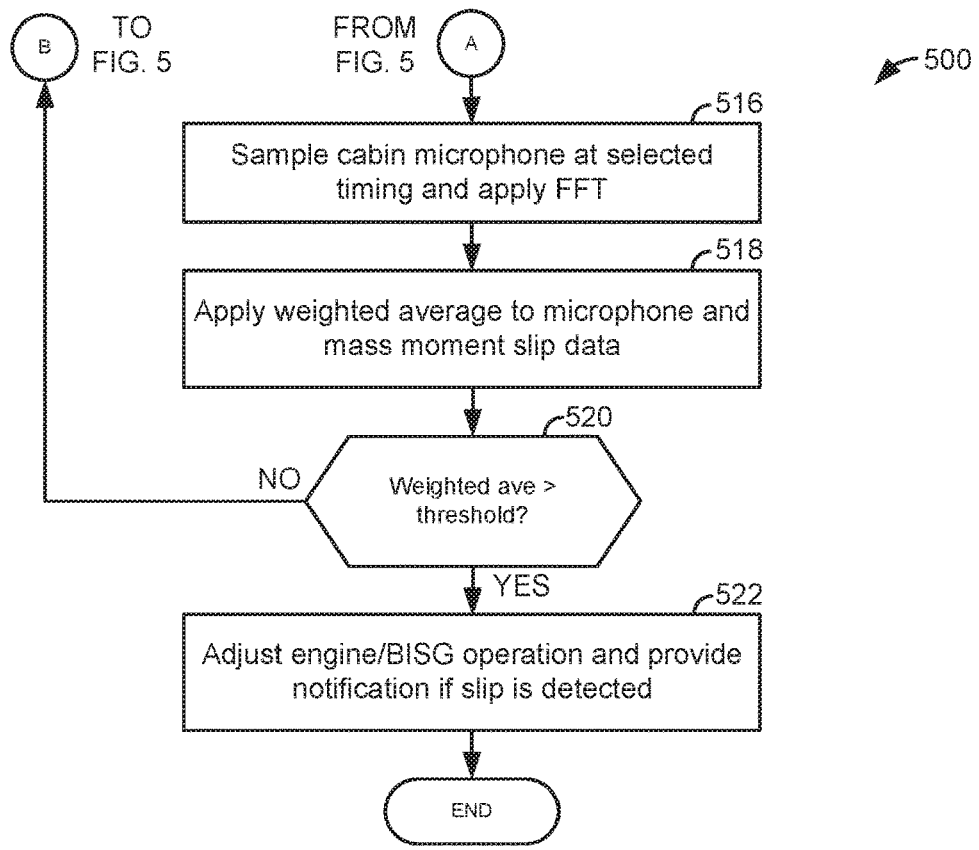

The present description is related to operating an engine that includes a front end accessory drive. The engine may be of the type shown in FIG. 1. The engine may be included in a driveline of a hybrid vehicle as is shown in FIG. 2. A control block diagram for detecting and indicating belt slip is shown in FIG. 3. A vehicle may be operated according to the sequence shown in FIG. 4. The sequence of FIG. 4 may be provided via the system of FIGS. 1 and 2 and the method of FIGS. 5 and 6. A flowchart of a method for operating a vehicle is shown in FIGS. 5 and 6.

Figure 1:
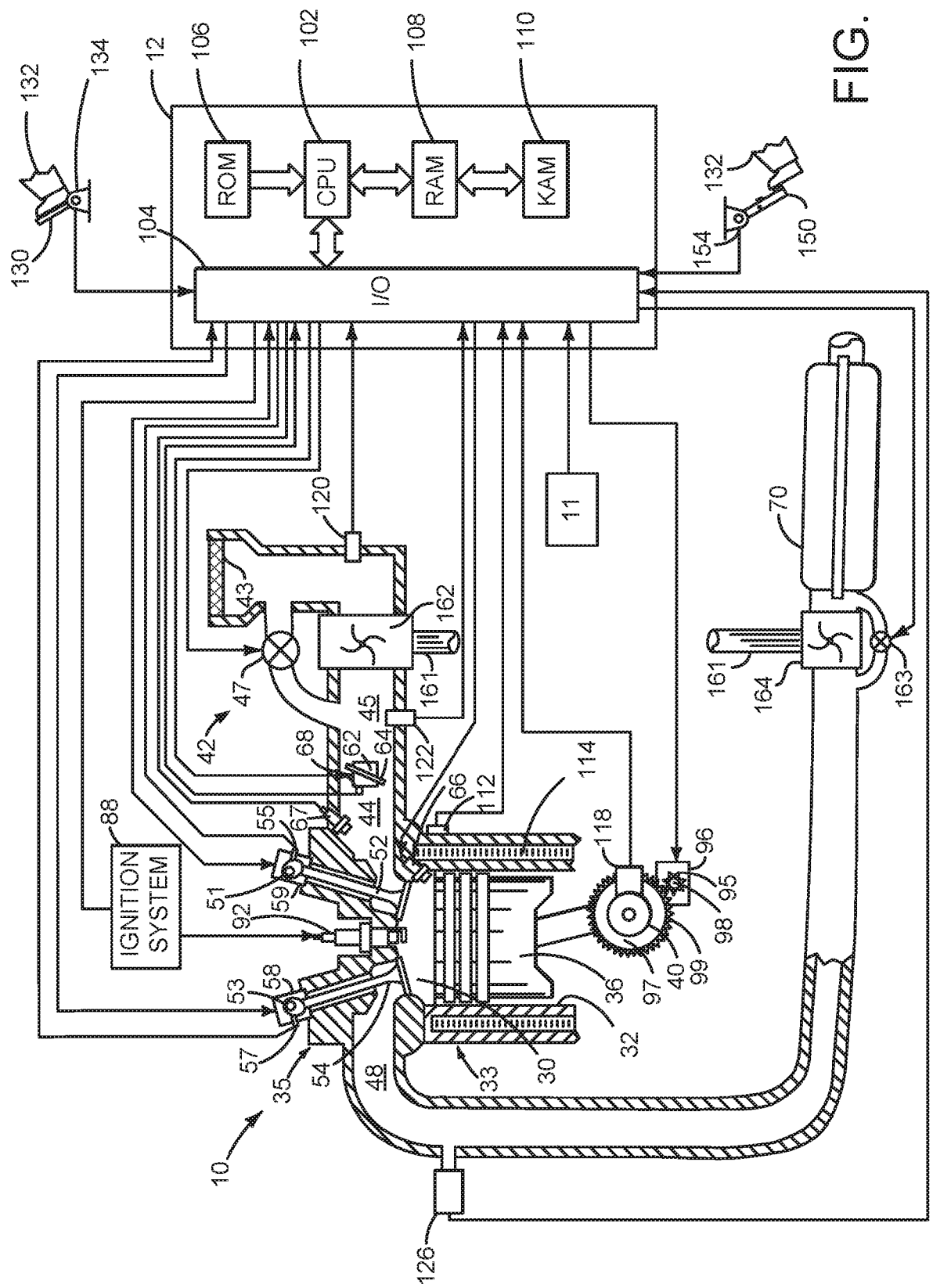
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126. Three-way catalyst 70 can include multiple bricks and a three-way catalyst coating, in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions. Vehicle system controller may also receive input from microphone 293 located in passenger cabin 294 for receiving audible instructions from a human driver or to detect sounds that may be heard in passenger cabin 294. Further, controller 255 may communicate with external computers 295 (e.g., servers) via a wireless or satellite antenna 296 to schedule vehicle service and to receive controller software modifications.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255.

Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

The system of FIGS. 1 and 2 provides for a system, comprising: an engine including an integrated starter/generator; and a controller including executable instructions stored in non-transitory memory to adjust operation of the engine responsive to an indication of belt slippage provided via a weighted average filter included within the controller, the weighted average filter including inputs for an audible signal amplitude or power level being exceeded and a first moment of inertia threshold being exceeded. The system further comprises additional instructions to include an input for a second moment of inertia threshold being exceeded with the weighted average filter. The system further comprises a microphone. The system further comprises additional instructions to sample the microphone responsive to a first mass moment of inertia being less than a first mass moment of inertia threshold. The system further comprises additional instructions to not sample the microphone in the absence of the first mass moment of inertia being less than the first mass moment of inertia threshold.

Referring now to FIG. 3, a block diagram of a system for indicating slip of a FEAR belt that may transfer torque between an engine and a BISG is shown. The block diagram may be incorporated into the vehicle system controller of FIG. 2, or alternatively the engine controller of FIGS. 1 and 2. Portions of the block diagram of FIG. 3 may be included as executable instructions in controller memory. Further, portions of the block diagram may be included in the method of FIGS. 5 and 6.

Engine crankshaft position is input to block 302 where its first derivative is generated with respect to time. Engine crankshaft position is determined from the engine crankshaft position sensor (e.g., 118 of FIG. 1). The first derivative of engine position is engine velocity, and engine velocity is output to block 304 where a second derivative is generated with respect to time. The second derivative of engine position is engine acceleration and it is input into block 306. Engine manifold absolute pressure (MAP), engine speed, engine lambda (e.g., engine air-fuel ratio/stoichiometric engine air-fuel ratio), and engine spark timing (SAF) are input to block 305, which models engine torque. The output of block 305 is input to block 306.

At 306, a first mass moment of inertia is determined by dividing engine torque by the engine's acceleration rate. The first mass moment of inertia is input to block 308 where it may be compared against a predetermined first mass moment of inertia (e.g., moment of inertia of the engine and accessories accelerated by the engine as observed at the engine including any adjustments for pulley ratios). For example, the predetermined first mass moment of inertia may be subtracted from the first mass moment of inertia. Alternatively, a standard deviation of the predetermined first mass moment of inertia may be subtracted from a standard deviation of first mass moment of inertia. In still another example, a mean of the predetermined first mass moment of inertia may be subtracted from a mean of the first mass moment of inertia. The results of the comparison are input to block 310 where it is determined if the results are less than a threshold value for the first mass moment of inertia. If the result of block 308 is less than the threshold value at 310, then block 310 outputs a logical level of one to indicate belt slip. The output of block 310 is input to blocks 312 and 316. Block 312 is a first weighted average filter and block 316 is a second weighted average filter.

BISG position is input to block 330 where its first derivative is generated with respect to time. BISG position is determined from the BISG position sensor (e.g., 203 of FIG. 2). The first derivative of BISG position is BISG velocity, and BISG velocity is output to block 332 where a second derivative is generated with respect to time. The second derivative of BISG position is BISG acceleration and it is input into block 334. BISG current, BISG voltage, and BISG temperature are input to block 335, which models BISG torque. The output of block 335 is input to block 334.

At 334, a second mass moment of inertia is determined by dividing BISG torque by the BISG's acceleration rate. The second mass moment of inertia is input to block 336 where it may be compared against a predetermined second mass moment of inertia (e.g., moment of inertia of the ISG, engine, and accessories as observed at the ISG, which may include an adjustment for pulley ratios). For example, the predetermined second mass moment of inertia may be subtracted from the second mass moment of inertia. Alternatively, a standard deviation of the predetermined second mass moment of inertia may be subtracted from a standard deviation of second mass moment of inertia. In still another example, a mean of the predetermined second mass moment of inertia may be subtracted from a mean of the second mass moment of inertia. The results of the comparison are input to block 338 where it is determined if the results are less than a threshold value for the second mass moment of inertia. If the result of block 336 is less than the threshold value at 338, then block 338 outputs a logical level of one to indicate belt slip. The output of block 338 is input to blocks 312 and 316.

Engine speed is input to block 309 where it is applied to reference a table or function of empirically determined values of weighting factors for the first and second moments of inertia. The weightings may be determined via operating an engine on a dynamometer while transiently controlling engine torque, engine speed, ISG speed, and audible noise. The weighting factor values may range from 0 to 1, but the sum of weighting factor values is equal to one. Block 309 outputs two weighting factor values to block 312.

At block 312, a weighted average of the outputs of blocks 310 and 338 is determined. In one example, the weighted average may be expressed as:

$$\text{First\_ave} = \frac{\alpha 1(\text{first\_mass\_moment}) + \alpha 2(\text{second\_mass\_moment})}{2}$$

where First_ave is the value of the weighted average of the output of blocks 310 and 338, α1 is a value of a first weighting factor for the first mass moment output of block 310, first_mass_moment is the output of block 310, α2 is a value of a first weighting factor for the second mass moment output of block 338, and second_mass_moment is the output of block 338. The weighted average of the first and second mass moment values output from blocks 310 and 338 is input to block 314. At block 314, it is judged if the weighted average is greater than a threshold value. If so, a logical one value is output to block 320. Otherwise, a logical level zero is output to block 320.

Output of a passenger cabin microphone (e.g., a microphone that may be used with an infotainment system) is input to block 320. Block 320 is a sampler (e.g., an analog to digital converter) that samples (e.g., takes measurements) of the passenger cabin microphone output at predetermined time intervals once the sampling is activated. The microphone is not sampled during conditions where FEAD belt slip is not expected (e.g., when the logical level output from block 314 is zero), thereby reducing computational load on the controller. The microphone is sampled during conditions where FEAD belt slip is expected (e.g., when the logical level output from block 314 is one), thereby processing microphone output for FEAD belt slip analysis. The sampler is activated to start sampling microphone output and deactivated to cease sampling the microphone output via an output of block 314. The sampled microphone output is input into block 322 where a fast Fourier transform (FFT) is performed on the sampled data. The output of the FFT may be amplitudes of signals and the corresponding frequencies of the signals that are in the output data of the microphone. Alternatively, the FFT may output a signal power levels and the corresponding frequencies of the signals that are in the output data of the microphone. The output of block 322 is input to block 324. Block 324 outputs a logical level one when amplitude of belt slip frequencies are greater than a threshold. Block 324 outputs a logical level zero when amplitude of belt slip frequencies are less than the threshold. The output of block 324 is input to block 316.

Engine speed is input to block 315 where it is applied to reference a table or function of empirically determined values of weighting factors for the first and second moments of inertia and the microphone output. The weightings may be determined via operating an engine on a dynamometer while transiently controlling engine torque, engine speed, ISG speed, and audible noise. The weighting factor values may range from 0 to 1, but the sum of weighting factor values is equal to one. Block 315 outputs three weighting factor values to block 316.

At block 316, a weighted average of the outputs of blocks 310, 338, and 324 is determined. In one example, the weighted average may be expressed as:

$$\text{Second\_ave} = \frac{\beta 1(\text{first\_mass\_moment}) + \beta 2(\text{second\_mass\_moment}) + \beta 3(\text{micro})}{3}$$

where Second_ave is the value of the weighted average of the output of blocks 310, 338, and 324, β1 is a value of a first weighting factor for the first mass moment output of block 310, first mass_moment is the output of block 310, β2 is a value of the second weighting factor for the second mass moment output of block 338, second_mass_moment is the output of block 338, β3 is a value of a third weighting factor for the microphone output. The weighted average of the first mass moment, second mass moment, and microphone output values is input to block 318.

At block 318, it is judged if the weighted average is greater than a threshold value. If so, a logical one value is output to indicate FEAD belt slip. Otherwise, a logical level zero is output to indicate an absence of FEAD belt slip.

In this way, data from three sources is input to a weighted average filter and the weighted average filter may provide an improved estimate of the presence or absence of FEAD belt slip. The FEAD belt slip estimate is based on microphone output and two different mass moment of inertia estimates. Output of the weighted average filter may be applied to adjust engine and/or BISG operation. Further, output of the weighted average filter may be a basis for scheduling maintenance on the vehicle.

Figure 4:
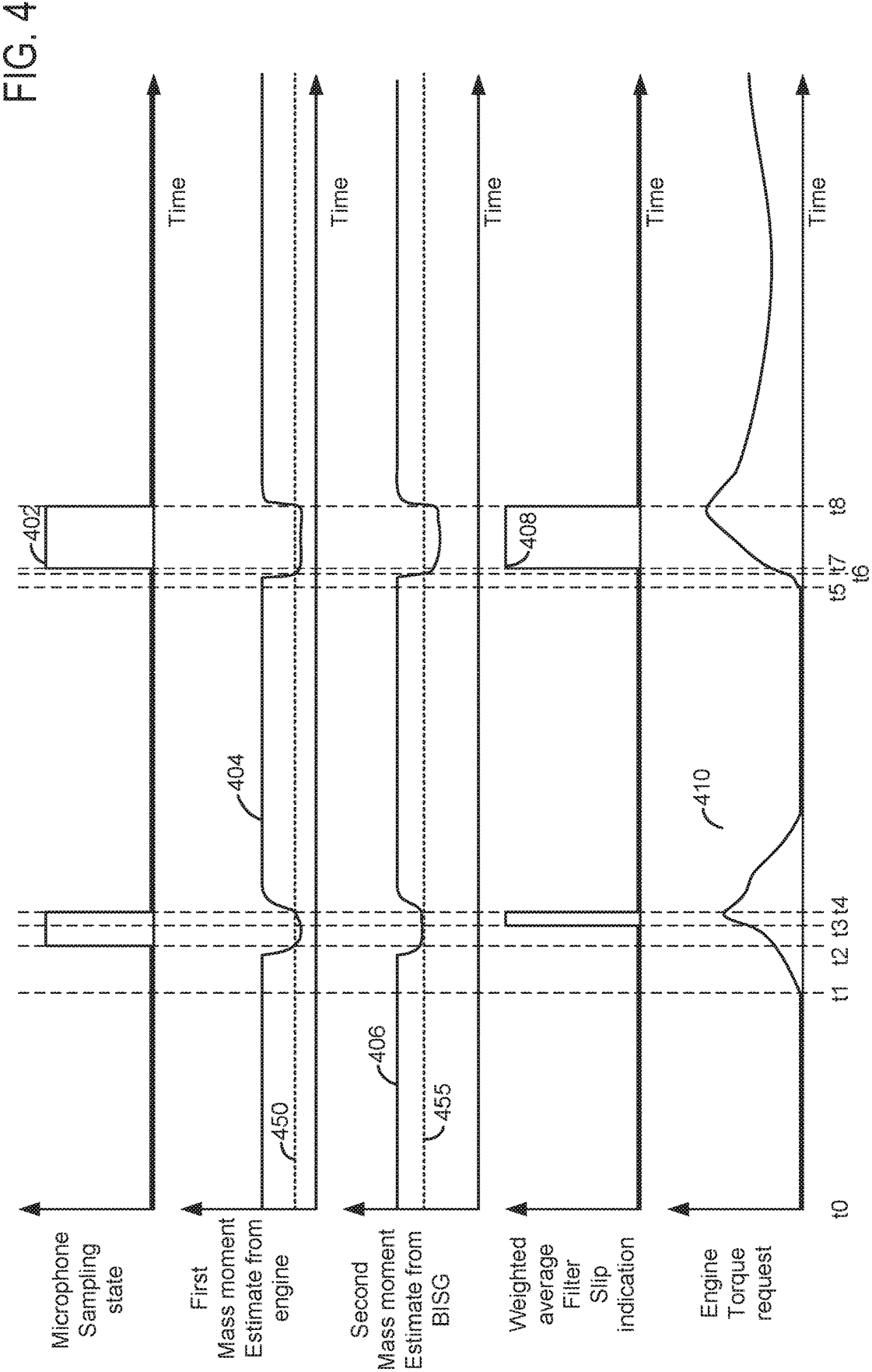
FIG. 4 shows an example vehicle operating sequence.

Referring now to FIG. 4, example plots of a prophetic vehicle operating sequence are shown. The operating sequence may be performed via the system of FIGS. 1 and 2 in cooperation with the method of FIGS. 5 and 6. Vertical lines at times t0-t8 represent times of interest during the sequence. The plots in FIG. 4 are time aligned and occur at the same time.

The first plot from the top of FIG. 4 is a plot of passenger cabin microphone sampling state versus time. The vertical axis represents passenger cabin microphone sampling state and passenger cabin microphone sampling occurs when trace 402 is at a higher level near the level of the vertical axis arrow. The passenger cabin microphone is not being sampled when trace 402 is at a lower level near the horizontal axis. The horizontal axis represents time and time increases from the left side of the figure to the right side of the figure. Trace 402 represents passenger cabin microphone sampling state.

The second plot from the top of FIG. 4 is a plot of a first mass moment of inertia as determined from engine acceleration. The vertical axis represents the value of the first mass moment of inertia as determined from engine acceleration and the value of the first mass moment of inertia increases in the direction of the vertical axis arrow. The horizontal axis represents time and time increases from the left side of the figure to the right side of the figure. Solid line 404 represents the first mass moment of inertia as determined from engine acceleration. Dashed line 450 represents a first mass moment of inertia threshold. Dashed line 450 represents a level of a first mass moment of inertia as determined from engine acceleration below which may indicate FEAD belt slip.

The third plot from the top of FIG. 4 is a plot of a second mass moment of inertia as determined from BISG acceleration. The vertical axis represents the value of the second mass moment of inertia as determined from BISG acceleration and the value of the second mass moment of inertia increases in the direction of the vertical axis arrow. The horizontal axis represents time and time increases from the left side of the figure to the right side of the figure. Solid line 406 represents the second mass moment of inertia as determined from BISG acceleration. Dashed line 455 represents a second mass moment of inertia threshold. Dashed line 455 represents a level of a second mass moment of inertia as determined from engine acceleration below which may indicate FEAD belt slip.

The fourth plot from the top of FIG. 4 is a plot of weighted average filter FEAD belt slip indication versus time. The weighted average filter FEAD slip indication indicates that FEAD belt slip is present when trace 408 is at a higher level near the level of the vertical axis arrow. The Weighted average filter FEAD slip indication indicates that FEAD belt slip is not present when trace 408 is at a lower level near the horizontal axis. The horizontal axis represents time and time increases from the left side of the figure to the right side of the figure. Trace 408 represents FEAD belt slip state.

The fifth plot from the top of FIG. 4 is a plot of an engine torque request versus time. The vertical axis represents the engine torque request and the engine torque request increases in the direction of the vertical axis arrow. The horizontal axis represents time and time increases from the left side of the figure to the right side of the figure. Solid line 410 represents an engine torque request. An engine of the vehicle operates (e.g., rotates and combusts fuel) throughout the sequence of FIG. 4.

At time t0, the engine (not shown) is operating (e.g., combusting fuel and rotating) and the first mass moment of inertia as determined from engine acceleration is at a higher level. The second mass moment of inertia as determined from BISG acceleration is at a higher level and the weighted average filter is not providing an indication of FEAD belt slip. The engine torque request is a low value.

At time t1, the engine torque request begins to increase at a lower rate and the microphone is not sampled. The first mass moment of inertia as determined from engine acceleration remains at a higher level as does the second mass moment of inertia as determined from BISG acceleration also remains at a higher level. The weighted average filter does not output an indication of FEAD belt slip.

Between time t1 and time t2, the engine torque increases at a higher rate and the microphone is not sampled. The first mass moment of inertia as determined from engine acceleration remains at a higher level as does the second mass moment of inertia as determined from BISG acceleration also remains at a higher level. The weighted average filter does not output an indication of FEAD belt slip.

At time t2, the engine torque request has increased to a higher level and the first mass moment of inertia as determined from engine acceleration has decreased to a level below threshold 450. The second mass moment of inertia as determined from BISG acceleration is also reduced, but it remains above threshold level 455. The microphone output begins to be sampled and the weighted average filter does not output an indication of FEAD belt slip.

At time t3, the engine torque request continues to be increased to a higher level and the first mass moment of inertia as determined from engine acceleration remains below threshold 450. The second mass moment of inertia as determined from BISG acceleration remains above threshold level 455. The microphone output continues to be sampled and the weighted average filter outputs an indication of FEAD belt slip.

At time t4, the engine torque request rate of increase has been reduced. The first mass moment of inertia as determined from engine acceleration increases to a level that is above threshold 450. The second mass moment of inertia as determined from BISG acceleration also increases and microphone output sampling is ceased. The weighted average filter ceases to output an indication of FEAD belt slip.

Between time t4 and time t5, the engine torque request is gradually reduced and microphone sampling is inhibited. The first mass moment of inertia as determined from engine acceleration remains above threshold 450. The second mass moment of inertia as determined from BISG acceleration remains above threshold 455 and the weighted average filter does not indicate FEAD belt slip.

At time t5, the engine torque request begins to increase at a lower rate and the microphone is not sampled. The first mass moment of inertia as determined from engine acceleration remains at a higher level as does the second mass moment of inertia as determined from BISG acceleration also remains at a higher level. The weighted average filter does not output an indication of FEAD belt slip.

Between time t5 and time t6, the engine torque begins to increase at a much higher rate and the microphone is not sampled. The first mass moment of inertia as determined from engine acceleration begins to decrease as does the second mass moment of inertia as determined from BISG acceleration also remains at a higher level. The weighted average filter does not output an indication of FEAD belt slip.

At time t6, the engine torque request has increased to a higher level and the first mass moment of inertia as determined from engine acceleration has decreased to a level below threshold 450. Likewise, the second mass moment of inertia as determined from BISG acceleration is reduced to a level that is less than threshold level 455. The microphone output begins to be sampled and the weighted average filter does not output an indication of FEAD belt slip.

At time t7, the engine torque request continues to be increased to a higher level and the first mass moment of inertia as determined from engine acceleration remains below threshold 450. The second mass moment of inertia as determined from BISG acceleration remains below threshold level 455. The microphone output continues to be sampled and the weighted average filter outputs an indication of FEAD belt slip.

At time t8, the engine torque request rate of increase has been reduced and the first mass moment of inertia as determined from engine acceleration increases above threshold 450. The second mass moment of inertia as determined from BISG acceleration also increases above threshold 455 and microphone output sampling is ceased. The weighted average filter ceases to output an indication of FEAD belt slip.

In this way, a weighted average filter may receive several inputs and output an improved estimate of FEAD belt slip. In one example, the weighted average filter inputs are a FFT processed microphone signal, a first mass moment of inertia being greater than a threshold level first mass moment of inertia, and a second mass moment of inertia being greater than a threshold level second mass moment of inertia.

Referring now to FIGS. 5 and 6, a flow chart of a method for operating a vehicle that includes an engine and a microphone for sensing audible sounds is shown. The method of FIGS. 5 and 6 may be incorporated into and may cooperate with the system of FIGS. 1 and 2. Further, at least portions of the method of FIGS. 5 and 6 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to engine speed, driver demand torque, engine temperature, engine load, BISG speed, and BISG torque. In one example, driver demand torque may be determined via indexing or referencing a table or function of empirically determined driver demand torque values via accelerator pedal position. Alternatively, a vehicle controller may output a voltage or a value of a variable to request driver demand torque in a case of an autonomous vehicle. Method 500 proceeds to 504.

At 504, method 500 determines first and second derivatives of BISG position and engine position. In particular, a first derivative of BISG position is determined with respect to time, and a second derivative of BISG position is determined with respect to time. Likewise, a first derivative of engine position is determined with respect to time, and a second derivative of engine position is determined with respect to time. Engine position and BISG position are determined via position sensors. Method 500 proceeds to 506.

At 506, method 500 estimates engine torque and BISG torque. In one example, MAP and engine load index or reference a table or function that describes engine torque. The table or function outputs an estimate of engine torque, and then, the engine torque estimate is adjusted according to the a difference between a present engine crankshaft angle for spark timing and minimum spark timing for best engine torque for the present engine speed and load. Further, the engine torque estimate is adjusted for the engine's present air-fuel ratio.

BISG torque may be estimated via referencing a table or function that contains empirically determined BISG torque values. The table or function may be referenced or indexed via an amount of current flowing into the BISG, BISG temperature, and a voltage that is applied to the BISG. The table or function outputs an estimated BISG torque value. Method 500 proceeds to 508.

At 508, method 500 estimates the first mass moment of inertia that is based on engine acceleration and the second mass moment of inertia that is based on BISG acceleration. In one example, the first mass moment of inertia is determined via the following equation:

$$Jeng = \frac{Teng}{\dot{\omega}eng}$$

where Jeng is the first mass moment of inertia that is based on engine acceleration, Teng is engine torque, and $\dot{\omega}$eng is engine acceleration. The second mass moment of inertia that is based on BISG acceleration is determined via the following equation:

$$J_{BISG} = \frac{T_{BISG}}{\dot{\omega}_{BISG}}$$

where $J_{BISG}$ is the second mass moment of inertia that is based on engine acceleration, $T_{BISG}$ is engine torque, and $\dot{\omega}_{BISG}$ is engine acceleration. Method 500 proceeds to 510.

At 510, method 500 performs statistical analysis on the first and second mass moments of inertia. In one example, a mean of the predetermined first mass moment of inertia may be subtracted from a mean of the first mass moment of inertia that was determined at 508. Further, predetermined first mass moment of inertia may be subtracted from the first mass moment of inertia. Further still, a standard deviation of the predetermined first mass moment of inertia may be subtracted from a standard deviation of first mass moment of inertia.

Regarding the second mass moment of inertia that is based on BISG speed, a mean of the predetermined second mass moment of inertia may be subtracted from a mean of the second mass moment of inertia that was determined at 508. Further, predetermined second mass moment of inertia may be subtracted from the second mass moment of inertia. Further still, a standard deviation of the predetermined second mass moment of inertia may be subtracted from a standard deviation of second mass moment of inertia. Method 500 proceeds to 512.

At 512, method 500 compares the statistical values that were determined for the first mass moment of inertia to threshold values. In one example, if method 500 determines that one of the statistical values determined at 510 for the first mass moment of inertia is less than a predetermined threshold, then method 500 generates a logical level one and stored the level in controller memory. Each of the statistical values determined at 510 may be compared to a unique threshold value, and a logical level may be provided for each comparison. For example, a result of the mean of the predetermined first mass moment of inertia subtracted from a mean of the first mass moment of inertia that was determined at 508 may be compared to a threshold value. If the result is less than the threshold value, a variable in controller memory may be asserted to a logical value of one to indicate that the threshold has been crossed. Otherwise, the logical value of the variable is zero. Similarly, a result of the predetermined first mass moment of inertia being subtracted from the first mass moment of inertia may be compared to a threshold level. If the result is less than the threshold value, a variable in controller memory may be asserted to a logical level one to indicate that the threshold has been crossed. Otherwise, the logical value of the variable is zero. In still another example, a result of the standard deviation of the predetermined first mass moment of inertia being subtracted from a standard deviation of first mass moment of inertia may be compared to a threshold level. If the result is less than the threshold value, a variable in controller memory may be asserted to a logical one to indicate that the threshold has been crossed. Otherwise, the logical value of the variable is zero.

At 512, the statistical values that were determined for the second mass moment of inertia are also compared to threshold values. In one example, if method 500 determines that one of the statistical values determined at 510 for the second mass moment of inertia is greater than a predetermined threshold, then method 500 generates a logical level one and stores the level in a variable in controller memory. Otherwise, the value of the variable is a logical zero. Each of the statistical values determined at 510 may be compared to a unique threshold value, and a logical level may be provided for each comparison. For example, a result of the mean of the predetermined second mass moment of inertia subtracted from a mean of the second mass moment of inertia that was determined at 508 may be compared to a threshold value. If the result is less than the threshold value, a variable in controller memory may be asserted to indicate that the threshold has been crossed. Similarly, a result of the predetermined second mass moment of inertia being subtracted from the second mass moment of inertia may be compared to a threshold level. If the result is less than the threshold value, a variable in controller memory may be asserted to indicate that the threshold has been crossed. In still another example, a result of the standard deviation of the predetermined second mass moment of inertia being subtracted from a standard deviation of second mass moment of inertia may be compared to a threshold level. If the result is less than the threshold value, a variable in controller memory may be asserted to indicate that the threshold has been crossed. The logical values of the variables may be input into a first weighted average filter and a second weighted average filter. If output of the first weighted average filter is greater than a threshold, then the microphone may be sampled. Otherwise, the microphone is not sampled. The weighting factors and weighting factor filter are discussed in the description of FIG. 3. Method 500 proceeds to 514.

At 514, method 500 judges if the output of the first weighted average filter is greater than a threshold value. If so, method 500 proceeds to 516. Otherwise, method 500 returns to 502 and the microphone output is not sampled.

At 516, the controller selectively samples output from a passenger cabin microphone. Sampling of the passenger cabin microphone may be initiated during conditions where FEAD belt slip may be more likely (e.g., during rapid changes in driver demand torque). However, by determining the presence or absence via inertia instead of a demand torque, it may be possible to improve FEAD belt slip detection. By selectively sampling the microphone, computational resources of the controller may be reserved. Further, data at frequencies where FEAD belt noise occurs are prevented from generating microphone output data. The output of the passenger cabin microphone is also processed via a discrete FFT. The output of the FFT is compared to predetermined amplitude levels for select frequencies (e.g., frequencies of FEAD belt noise). If the amplitude for a FEAD belt noise frequency exceeds a threshold level, a variable input to the weighted average filter at 518 is asserted to a logical one level. Otherwise, the variable is a logical zero level. Method 500 proceeds to 518.

At 518, method 500 processes data from 516 and 512 via a weighted average filter to improve estimation of FEAD belt slip. In one example, the weighted average filter may be represented as:

$$\text{Second\_ave} = \frac{\beta 1(\text{first\_mass\_moment}) + \beta 2(\text{second\_mass\_moment}) + \beta 3(\text{micro})}{3}$$

where the variables are as previously described at 316. Method 500 proceeds to 520.

At 520, method 500 judges if the second weighted average value exceeds a second threshold. If so, the answer is yes and method 500 proceeds to 522. Otherwise, the answer is no and method 500 returns to 502.

At 522, method 500 adjusts engine operation and/or BISG operation in response to an indication of FEAD belt slip. In one example, a rate of engine torque increase may be limited to less than a threshold rate of engine torque increase if FEAD belt slip is detected so that the possibility of FEAD belt slip may be reduced. In addition, method 500 may communicate the presence of FEAD belt slip to an external server so that vehicle servicing may be performed (e.g., belt replacement, tensioner replacement, etc.). In one example, the rate of engine torque increase may be limited via limiting a rate at which a throttle may be opened. Further, the rate of engine torque increase may be limited via limiting cam timing, fuel injection timing, and spark timing. For example, during conditions where FEAD belt slip is not detected, the engine rate of torque change may be 200 Newton-meters (Nm) per second (e.g., a maximum threshold that is not to be exceeded). However, if FEAD belt slip is indicated via the weighted average filter, then the engine rate of torque change may be reduced to 150 Nm/second (e.g., a maximum threshold that is not to be exceeded).

Method 500 may also adjust BISG operation in response to an indication of FEAD belt slip. In one example, a rate of BISG torque increase may be limited to less than a threshold rate of BISG torque increase if FEAD belt slip is detected so that the possibility of FEAD belt slip may be reduced. In one example, the rate of BISG torque increase may be limited via limiting an amount of current that is supplied to the BISG. For example, during conditions where FEAD belt slip is not detected the BISG rate of torque change may be 50 Newton-meters (Nm) per second (e.g., a maximum threshold that is not to be exceeded). However, if FEAD belt slip is indicated via the weighted average filter, then the BISG rate of torque change may be reduced to 25 Nm/second (e.g., a maximum threshold that is not to be exceeded).

In this way, detection and mitigation of FEAD belt slip may be improved. Further, sampling of a passenger cabin microphone for detecting FEAD belt slip may be improved to reduce computational load on a controller.

Thus, the method of FIGS. 5 and 6 provides for an engine operating method, comprising: indicating a belt slippage via a controller, the belt slippage indicated responsive to a weighted average of a first moment of inertia threshold being crossed, a second moment of inertia threshold being crossed, and an audible signal amplitude or power level being crossed; and adjusting operation of a machine responsive to the indication of belt slippage. The method includes where the first moment of inertia threshold is crossed by a first moment of inertia that is based on a first torque source, the first torque source in contact with a front end accessory drive belt. The method includes where the second moment of inertia threshold is crossed by a second moment of inertia that is based on a second torque source, the second torque source in contact with a front end accessory drive belt. The method includes where the weighted average is determined from three weighting factors that are a function of a speed of an engine. The method includes where the audible signal amplitude or power is generated via a microphone and a fast Fourier transform.

In some examples, the method further comprises estimating a first moment of inertia via an engine torque model and an engine position sensor. The method further comprises twice differentiating a signal from the engine position sensor and dividing a torque output from the engine torque model via the twice differentiated signal from the engine position sensor. The method further comprises estimating a first moment of inertia via an integrated starter/generator (ISG) torque model and an ISG position sensor. The method further comprises twice differentiating a signal from the ISG position sensor and dividing a torque output from the ISG torque model via the twice differentiated signal from the ISG position sensor.

The method of FIGS. 5 and 6 also provides for an engine operating method, comprising: adjusting sampling of a passenger cabin microphone via a controller responsive to a first indication of belt slippage, the first indication of belt slippage based on a change of a mass moment of inertia; and providing a second indication of belt slippage via a weighted average of three belt slip signals included in the controller. The method includes where adjusting sampling of the passenger cabin microphone includes beginning to sample the passenger cabin microphone from a condition when the microphone was not being sampled. The method further comprises not sampling the passenger cabin microphone for monitoring belt slippage when the mass moment of inertia is greater than a threshold. The method further comprises adjusting operation of a machine responsive to the second indication of belt slippage. The method includes where the machine is an engine, and where adjusting operation of the machine includes limiting a rate of engine torque increase. The method further comprises processing output of the passenger cabin microphone via a fast Fourier transform in response to the first indication of belt slippage.

In another representation, the method of FIGS. 5 and 6 provide for an engine operating method comprising: adjust operation of the engine responsive to an indication of belt slippage provided via a weighted average filter included within a controller, the weighted average filter including inputs for an audible signal amplitude or power level being crossed, a first moment of inertia threshold being crossed, and a second moment of inertia being crossed. The method includes where the first moment of inertia threshold is crossed by a first moment of inertia being less than the first moment of inertia threshold. The method includes where the second moment of inertia threshold is crossed by a second moment of inertia being less than the second moment of inertia threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. An engine operating method, comprising:
indicating a belt slippage via a controller, the belt slippage indicated responsive to a weighted average of a first moment of inertia threshold being crossed, a second moment of inertia threshold being crossed, and an audible signal amplitude or power level threshold being crossed; and
adjusting operation of a machine responsive to the indication of belt slippage.

2. The method of claim 1, where the first moment of inertia threshold is crossed by a first moment of inertia that is based on a first torque source, the first torque source in contact with a front end accessory drive belt.

3. The method of claim 2, where the second moment of inertia threshold is crossed by a second moment of inertia that is based on a second torque source, the second torque source in contact with the front end accessory drive belt.

4. The method of claim 1, where the weighted average is determined from three weighting factors that are a function of a speed of an engine.

5. The method of claim 1, where an audible signal amplitude or power is generated via a microphone and a fast Fourier transform.

6. The method of claim 1, further comprising estimating a first moment of inertia via an engine torque model and an engine position sensor.

7. The method of claim 6, further comprising twice differentiating a signal from the engine position sensor and dividing a torque output from the engine torque model via the twice differentiated signal from the engine position sensor.

8. The method of claim 1, further comprising estimating a first moment of inertia via a belt integrated starter/generator (BISG) torque model and a BISG position sensor.

9. The method of claim 8, further comprising twice differentiating a signal from the BISG position sensor and dividing a torque output from the BISG torque model via the twice differentiated signal from the BISG position sensor.

10. A system, comprising:
an engine including an integrated starter/generator; and
a controller including executable instructions stored in non-transitory memory to adjust operation of the engine responsive to an indication of belt slippage provided via a weighted average filter included within the controller, the weighted average filter including inputs for an audible signal amplitude or power level being crossed and a first moment of inertia threshold being crossed.

11. The system of claim 10, further comprising additional instructions to include an input for a second moment of inertia threshold being crossed with the weighted average filter.

12. The system of claim 10, further comprising a microphone.

13. The system of claim 12, further comprising additional instructions to sample the microphone responsive to a first mass moment of inertia being less than a first mass moment of inertia threshold.

14. The system of claim 13, further comprising additional instructions to not sample the microphone in an absence of the first mass moment of inertia being less than the first mass moment of inertia threshold.

* * * * *